United States Patent
Shi et al.

(10) Patent No.: US 11,719,985 B2
(45) Date of Patent: Aug. 8, 2023

(54) NON-MECHANICAL MULTI-MODE MCF/CF

(71) Applicant: ChemImage Corporation, Pittsburgh, PA (US)

(72) Inventors: Lei Shi, Wexford, PA (US); George Ventouris, Valley City, OH (US)

(73) Assignee: ChemImage Corporation, Pittsburgh, PA (US)

( * ) Notice: Subject to any disclaimer, the term of this patent is extended or adjusted under 35 U.S.C. 154(b) by 0 days.

(21) Appl. No.: 17/813,392

(22) Filed: Jul. 19, 2022

(65) Prior Publication Data

US 2023/0036774 A1 Feb. 2, 2023

Related U.S. Application Data

(60) Provisional application No. 63/223,348, filed on Jul. 19, 2021.

(51) Int. Cl.
*G02F 1/1347* (2006.01)
*G02B 5/20* (2006.01)

(52) U.S. Cl.
CPC ......... *G02F 1/13471* (2013.01); *G02B 5/208* (2013.01)

(58) Field of Classification Search
CPC ............................ G02F 1/13471; G02B 5/208
See application file for complete search history.

(56) References Cited

U.S. PATENT DOCUMENTS

| | | | |
|---|---|---|---|
| 5,132,826 A | | 7/1992 | Johnson et al. |
| 5,929,946 A | * | 7/1999 | Sharp ................. H04N 9/3111 349/97 |
| 6,992,809 B1 | | 1/2006 | Wang et al. |
| 7,362,489 B2 | | 4/2008 | Wang et al. |
| 8,400,574 B2 | | 3/2013 | Voigt et al. |
| 8,736,777 B2 | | 5/2014 | Voigt et al. |
| 9,041,932 B2 | | 5/2015 | Priore et al. |
| 2006/0038929 A1 | | 2/2006 | Wang |
| 2013/0038877 A1 | | 2/2013 | Nelson |
| 2013/0120695 A1 | | 5/2013 | Li et al. |

OTHER PUBLICATIONS

Bos et al. "The pi-Cell: A Fast Liquid-Crystal Optical-Switching Device" 1984, Mol. Cryst. Liq. Cryst. 113:329-339.

* cited by examiner

*Primary Examiner* — Lucy P Chien
(74) *Attorney, Agent, or Firm* — DLA Piper LLP (57) ABSTRACT

A non-mechanical liquid crystal tunable filter (LCTF) assembly capable of switching between a multi-conjugate filter mode and a conformal filter mode is described. The non-mechanical LCTF architecture can include a plurality of LCTF components that each comprises a first optical filter comprising a first optical axis, a second optical filter comprising a second optical axis, wherein the second optical axis is rotated 90° relative to the first optical axis, and a first twisted nematic cell positioned between the first optical filter and the second optical filter, the first twisted nematic cell configured to polarize received light by 90° when a voltage is not applied and not polarize the received light when the voltage is applied. The non-mechanical LCTF assembly is configured to switch between a conformal filter mode and a multi-conjugate filter mode based on whether the voltage is applied to each of the plurality of LCTF components.

3 Claims, 8 Drawing Sheets

NON-MECHANICAL MULTI-MODE MCF/CF

CROSS-REFERENCE TO RELATED APPLICATIONS

This application claims priority to and the benefit of U.S. Provisional Application No. 63/223,348 filed on Jul. 19, 2021, the entirety of which is incorporated by reference herein.

BACKGROUND

In the field of molecular chemical imaging, different optical filter assemblies that are switchable between different modes are useful for a variety of different reasons, including improved hyperspectral imaging (e.g., to differentiate between a target and background), concentrate filtering effects on specific wavelengths or wavelength ranges, being able to quickly utilize the benefits of different modes during operation (e.g., use the filter in a conformal filter mode for fast discrimination and, if necessary, switch to a multi-conjugate filter mode for higher resolution analysis and potential identification), and so on. Conventional switchable filter assemblies operate by physically moving filter stages in and out of the optical path in order to switch between the different filtering modes. However, this requires the use of complex mechanical parts and movement control schemes, which introduces several potential error points into the filter assemblies.

Therefore, optical filter assemblies that are switchable between different modes, without the use of mechanical movement and control of the filter stages, would be highly beneficial because they would provide multiple imaging modes on a single platform with fewer error points. Further, it would be beneficial for such non-mechanical, multi-mode optical filter assemblies to be compatible with existing controller boards, interface boards, and other hardware in order to minimize the amount of redesigning required to incorporate the optical filter assemblies into imaging systems.

SUMMARY

This disclosure is generally directed to a non-mechanical liquid crystal tunable filter (LCTF) architecture capable of switching between a multi-conjugate filter (MCF) mode and a conformal filter (CF) mode.

In some embodiments, there is provided a non-mechanical liquid crystal tunable filter (LCTF) assembly comprising: a first LCTF component comprising: a first optical filter comprising a first optical axis, a second optical filter comprising a second optical axis, wherein the second optical axis is rotated 90° relative to the first optical axis, and a first twisted nematic cell positioned between the first optical filter and the second optical filter, the first twisted nematic cell configured to polarize received light by 90° when a first voltage is not applied and not polarize the received light when the first voltage is applied; and a second LCTF component comprising: a third optical filter comprising a third optical axis, a fourth optical filter comprising a fourth optical axis, wherein the fourth optical axis is rotated 90° relative to the third optical axis, and a second twisted nematic cell positioned between the third optical filter and the fourth optical filter, the second twisted nematic cell configured to polarize received light by 90° when a second voltage is not applied and not polarize the received light when the second voltage is applied; wherein the non-mechanical LCTF assembly is configured to switch between a conformal filter mode and a multi-conjugate filter mode based on whether the first voltage is applied to the first LCTF assembly, the second voltage if applied to the second LCTF assembly, or a combination thereof.

In some embodiments, there is provided a non-mechanical liquid crystal tunable filter (LCTF) assembly comprising: a plurality of LCTF components, each of the plurality of LCTF components comprising: a first optical filter comprising a first optical axis, a second optical filter comprising a second optical axis, wherein the second optical axis is rotated 90° relative to the first optical axis, and a first twisted nematic cell positioned between the first optical filter and the second optical filter, the first twisted nematic cell configured to polarize received light by 90° when a voltage is not applied and not polarize the received light when the voltage is applied; wherein the non-mechanical LCTF assembly is configured to switch between a conformal filter mode and a multi-conjugate filter mode based on whether the voltage is applied to each of the plurality of LCTF components.

In some embodiments, the non-mechanical LCTF assemblies could be used in a variety of different applications, including threat detection, identifying chemical materials, and/or molecular imaging (e.g., tumor margin detection).

In some aspects, the techniques described herein relate to a non-mechanical liquid crystal tunable filter (LCTF) assembly including: a first LCTF component including: a first optical filter including a first optical axis, a second optical filter including a second optical axis, wherein the second optical axis is rotated 90° relative to the first optical axis, and a first twisted nematic cell positioned between the first optical filter and the second optical filter, the first twisted nematic cell configured to polarize received light by 90° when a first voltage is not applied and not polarize the received light when the first voltage is applied; and a second LCTF component including: a third optical filter including a third optical axis, a fourth optical filter including a fourth optical axis, wherein the fourth optical axis is rotated 90° relative to the third optical axis, and a second twisted nematic cell positioned between the third optical filter and the fourth optical filter, the second twisted nematic cell configured to polarize received light by 90° when a second voltage is not applied and not polarize the received light when the second voltage is applied; wherein the non-mechanical LCTF assembly is configured to switch between a conformal filter mode and a multi-conjugate filter mode based on whether the first voltage is applied to the first LCTF assembly, the second voltage if applied to the second LCTF assembly, or a combination thereof.

In some aspects, the techniques described herein relate to a non-mechanical LCTF assembly, wherein first optical filter, the second optical filter, the third optical filter, and the fourth optical filter each include a Lyot filter.

In some aspects, the techniques described herein relate to a non-mechanical liquid crystal tunable filter (LCTF) assembly including: a plurality of LCTF components, each of the plurality of LCTF components including: a first optical filter including a first optical axis, a second optical filter including a second optical axis, wherein the second optical axis is rotated 90° relative to the first optical axis, and a first twisted nematic cell positioned between the first optical filter and the second optical filter, the first twisted nematic cell configured to polarize received light by 90° when a voltage is not applied and not polarize the received light when the voltage is applied; wherein the non-mechanical LCTF assembly is configured to switch between a conformal filter mode and a multi-conjugate filter mode based on whether the voltage is applied to each of the plurality of LCTF components.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

This disclosure is not limited to the particular systems, methods, and computer program products described, as these may vary. The terminology used in the description is for the purpose of describing the particular versions or embodiments only, and is not intended to limit the scope.

The embodiments described below are not intended to be exhaustive or to limit the teachings to the precise forms disclosed in the following detailed description. Rather, the embodiments are chosen and described so that others skilled in the art may appreciate and understand the principles and practices of the present teachings.

As used herein, the term "light" refers to electromagnetic radiation at wavelengths across the electromagnetic spectrum. Accordingly, the term "light" should not be understood to refer only to visible light or electromagnetic radiation within any other particular subset of the electromagnetic spectrum (e.g., infrared light or ultraviolet violet).

Various embodiments described herein use the terms "conformal filter" and "multi-conjugate filter." A "conformal filter" should be understood as a tunable hyperspectral imaging filter configured to filter interacted photons conforming to a spectral shape correlated with an analyte of interest. Additional information regarding conformal filters can be found in U.S. Pat. No. 9,041,932, titled CONFORMAL FILTER AND METHOD FOR USE THEREOF, which is hereby incorporated by reference herein in its entirety. A "multi-conjugate filter" should be understood as a tunable hyperspectral imaging filter having serial stages along an optical signal path in a Solc filter configuration. A Solc filter is a type of birefringent filter having multiple identical birefringent elements arranged in a "fan" configuration, a "folded" configuration, or various other configurations. Additional information regarding multi-conjugate filters can be found in U.S. Pat. No. 6,992,809, titled MULTI-CONJUGATE LIQUID CRYSTAL TUNABLE FILTER, U.S. Pat. No. 7,362,489, also titled MULTI-CONJUGATE LIQUID CRYSTAL TUNABLE FILTER, U.S. Pat. No. 8,736,777, titled VIS-SNIR MULTI-CONJUGATE LIQUID CRYSTAL TUNABLE FILTER, and U.S. Pat. No. 8,400,574, titled SHORT WAVE INFRARED MULTI-CONJUGATE LIQUID CRYSTAL TUNABLE FILTER, each of which is hereby incorporated by reference herein in its entirety.

Spectroscopic devices operate over a range of wavelengths depending on the desired operational ranges of the detectors or tunable filters. Accordingly, the tunable filters described herein can be configured to operate over a variety of different wavelength ranges, such as the wavelength ranges corresponding to ultraviolet (UV), visible (VIS), near-infrared (NIR), short-wave infrared (SWIR), mid-wave infrared (MWIR), long-wave infrared (LWIR), or overlapping ranges thereof. These wavelength ranges can correspond to ranges of approximately 180-380 nm (UV), 380-700 nm (VIS), 700-2500 nm (NIR), 850-1800 nm (SWIR), 650-1100 nm (MWIR), 400-1100 (VIS-NIR), and 1200-2450 nm (LWIR).

The disclosure contemplates tunable filter systems and methods that are designed to switch between different operational modes, particularly between a CF mode and a MCF mode, without mechanical manipulation of the optical elements or stages. In particular, the filter system can be switched between the CF and MCF modes via electrical control. Further details of the disclosure are provided below.

Non Mechanical Multi-Mode MCF/CF Optical Filters

Described herein are optical filter elements and optical filter assemblies that are switchable between multiple modes, including a CF mode and an MCF mode, via non-mechanical (e.g., electronic or electrical) control. In particular, the optical filter assemblies can include one or more such elements (i.e., stages) where the optical properties of the filter elements are electrically controllable.

Figure 1:
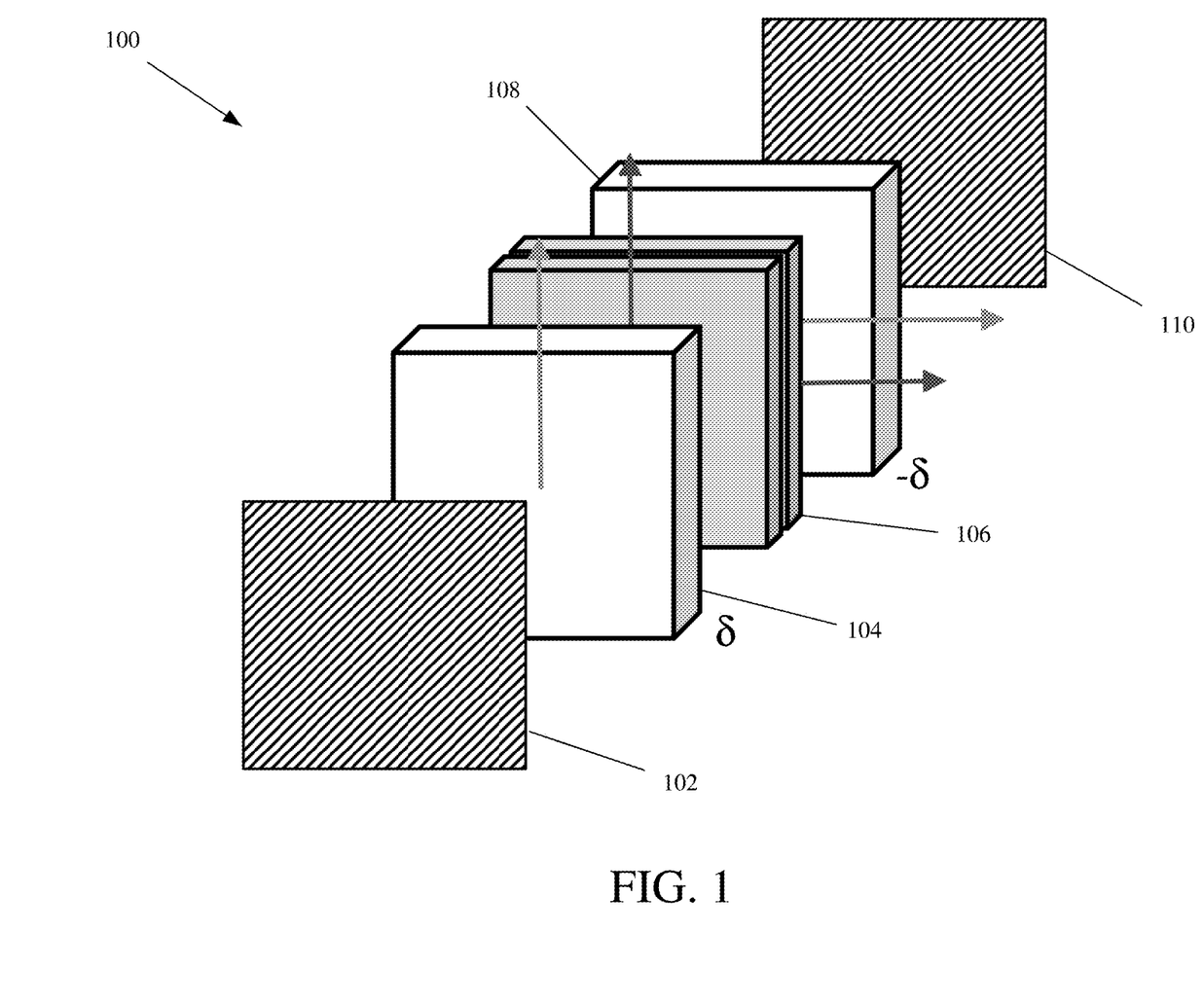
FIG. 1 depicts an LCTF stage configured to switch between a MCM mode and CF mode, in accordance with an embodiment.

In one embodiment shown in FIG. 1, an LCTF stage or component 100 can include a first polarizer 102, a first optical filter 104, a twisted nematic (TN) cell 106, a second optical filter 108, and a second polarizer 110 (i.e., an analyzer) positioned along an optical path. As shown in FIG. 1, the TN cell 106 is positioned or sandwiched between the first and second optical filters 104, 108. In one embodiment, the first and second polarizers 102, 110 can be parallel polarizers. In one embodiment, the first optical filter 104 and the second optical filter 108 can each include a Lyot filter.

In one embodiment, one or both of the first optical filter 104 and the second optical filter 108 can include an electronically controlled birefringence (ECB) cell. In one embodiment, one or both of the first optical filter 104 and the second optical filter 108 can include a Pi cell.

The TN cell 106 may comprise a 90° TN cell, for example. TN cells 106 are electrically controllable optical components that selectively alter the polarization of light entering the cells based on whether a sufficient voltage is applied to the cells. When no voltage is applied to a TN cell 106, the polarization of light entering the TN cell is rotated by a defined amount (e.g., 90°) at the exit of the cell. When a sufficient voltage (e.g., 5 V) is applied to a TN cell 106, the polarization of the light propagating through the TN cell 106 is unaffected. When the sufficient voltage is applied to the TN cell 106, this can be referred to as the "deactivated" or "off" state for the TN cell. Conversely, when no voltage is applied to the TN cell 106, this can be referred to as the "activated" or "on" state for the TN cell.

In one embodiment, the first and second optical filters 104, 108 can have similar properties, except that one of the filters is rotated by 90° with respect to the other. Accordingly, the phase retardation of the first optical filter 104 can be denoted as δ, and the phase retardation of the second optical filter 108 can be denoted as −δ. For a TN cell 106, the Mauguin condition can be defined as $$\frac{2 \cdot \Delta n \cdot d}{\lambda} \gg 1,$$

where $\Delta n = n_e - n_o$ (which is birefringence), $n_o$ is the ordinary refractive index, $n_e$ is the extra-ordinary refractive index, d is thickness of the liquid crystal (LC) layer, and λ is the wavelength of the incident light. For a 90° TN cell 106, if the Mauguin condition is fulfilled and the polarization direction of incoming light is parallel to the director at the incidence, the polarization of the propagating light will follow the twist of the local directors in the TN cell 106. Accordingly, the output polarization of the light will be rotated by 90°.

Conversely, when an appropriate voltage (e.g., 5 V) is applied to the TN cell 106, a strong electric field is built up across the TN cell 106. As a result of dielectric anisotropy, the liquid crystal in the TN cell 106 will align parallel to the electric field, which is perpendicular to the surface. This leads to a homeotropically aligned configuration of the LC directors in the TN cell 106. As a result, the effective birefringence of the liquid crystal is equivalent to zero degrees for normal incidence of light. Accordingly, the plane of the polarization from the first optical filter 104 will remain unchanged by the TN cell 106, and no extra phase retardation will occur because of the zero effective birefringence. In other words, when deactivated, the TN cell 106 will simply be transparent between the first optical filter 104 with phase δ and the second optical filter 108 with phase −δ. As such, the phase retardation of the first optical filter 104 will be cancelled by the phase retardation of the second optical filter 108. Therefore, the total phase retardation will be equal to 0, and the LCTF stage 100, as a whole, will effectively be transparent to any received light.

Accordingly, when the TN cell 106 is in the deactivated state, the TN cell 106 does not affect the polarization of light propagating therethrough. Therefore, the net phase retardation of light propagating through the LCTF stage 100 would be zero (i.e., δ+−δ), independent of the wavelength of the light.

In contrast, when the TN cell 106 is in the activated state, the polarization of the light propagating through the TN cell will be rotated by 90°. Accordingly, the ideal phase retardation will change the phase of the light propagating through the TN cell 106 from +δ to −δ. Further, there will be an extra phase delay Δ due to the planar twist director configuration with the birefringence between $n_o$ and $n_e$. In other words, in addition to the rotation of the polarization state by the 90° twist, the birefringence of the TN cell itself will have some contribution on the retardation, which is defined as the phase delay Δ. Therefore, the net phase retardation of the light propagating through the LCTF stage 100 would be −2δ+Δ.

The LCTF stage 100 can be configured to function across a variety of different wavelength ranges by adjusting the optical properties of the polarizers 102, 110, the filters 104, 108, and the TN cell 106. Because the LCTF stage 100 can be customized to operate within a desired wavelength range, various embodiments could thus be implemented for a variety of different purposes. For example, a SWIR MCF, LCTF, CF could be used for threat detection or to identify chemical materials. As another example, a VIS or NIR MCF, LCTF, or CF could be used for molecular imaging, such as tumor margin detection.

Figure 2A:
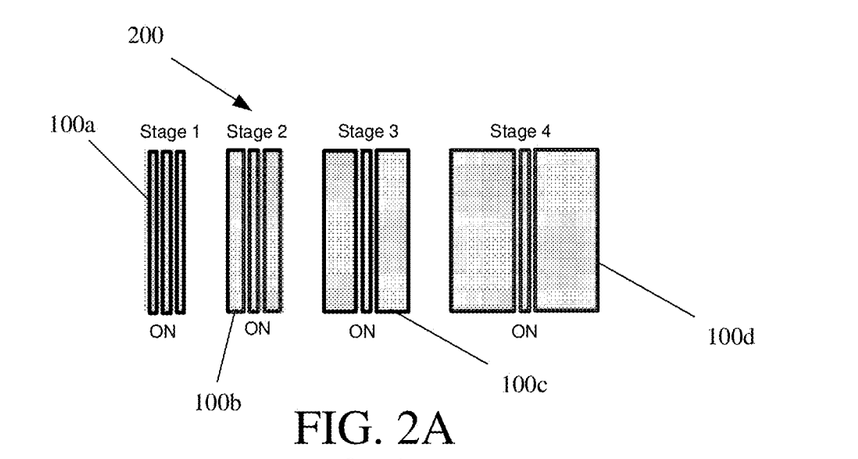
FIG. 2A depicts an LCTF assembly comprising multiple stages, wherein the LCTF assembly is in a first state, in accordance with an embodiment.
Figure 2B:
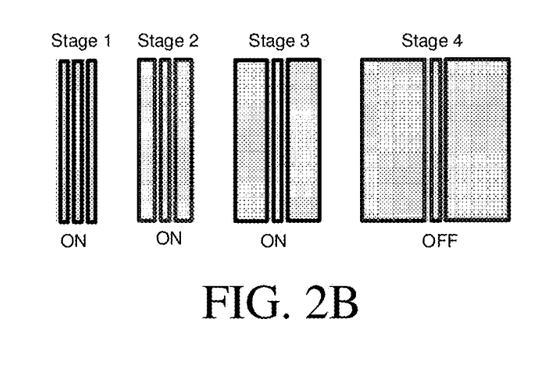
FIG. 2B depicts the LCTF assembly of FIG. 2A, wherein the LCTF assembly is in a second state, in accordance with an embodiment.
Figure 2C:
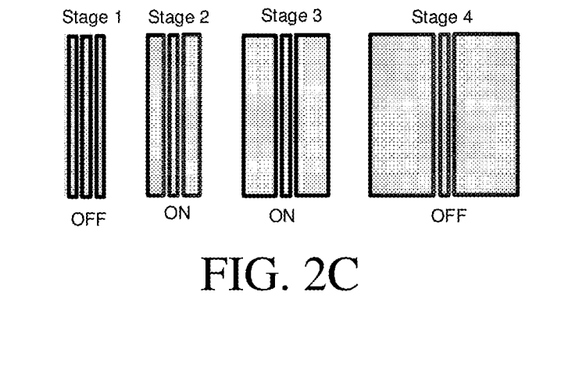
FIG. 2C depicts an LCTF assembly of FIG. 2A, wherein the LCTF assembly is in a third state, in accordance with an embodiment.
Figure 2D:
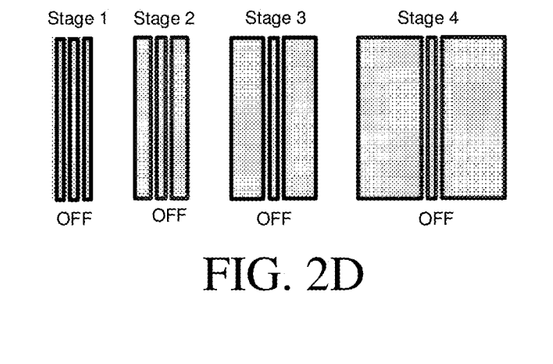
FIG. 2D depicts an LCTF assembly of FIG. 2A, wherein the LCTF assembly is in a fourth state, in accordance with an embodiment.
Figures 3A, 3B, 3C, 3D:
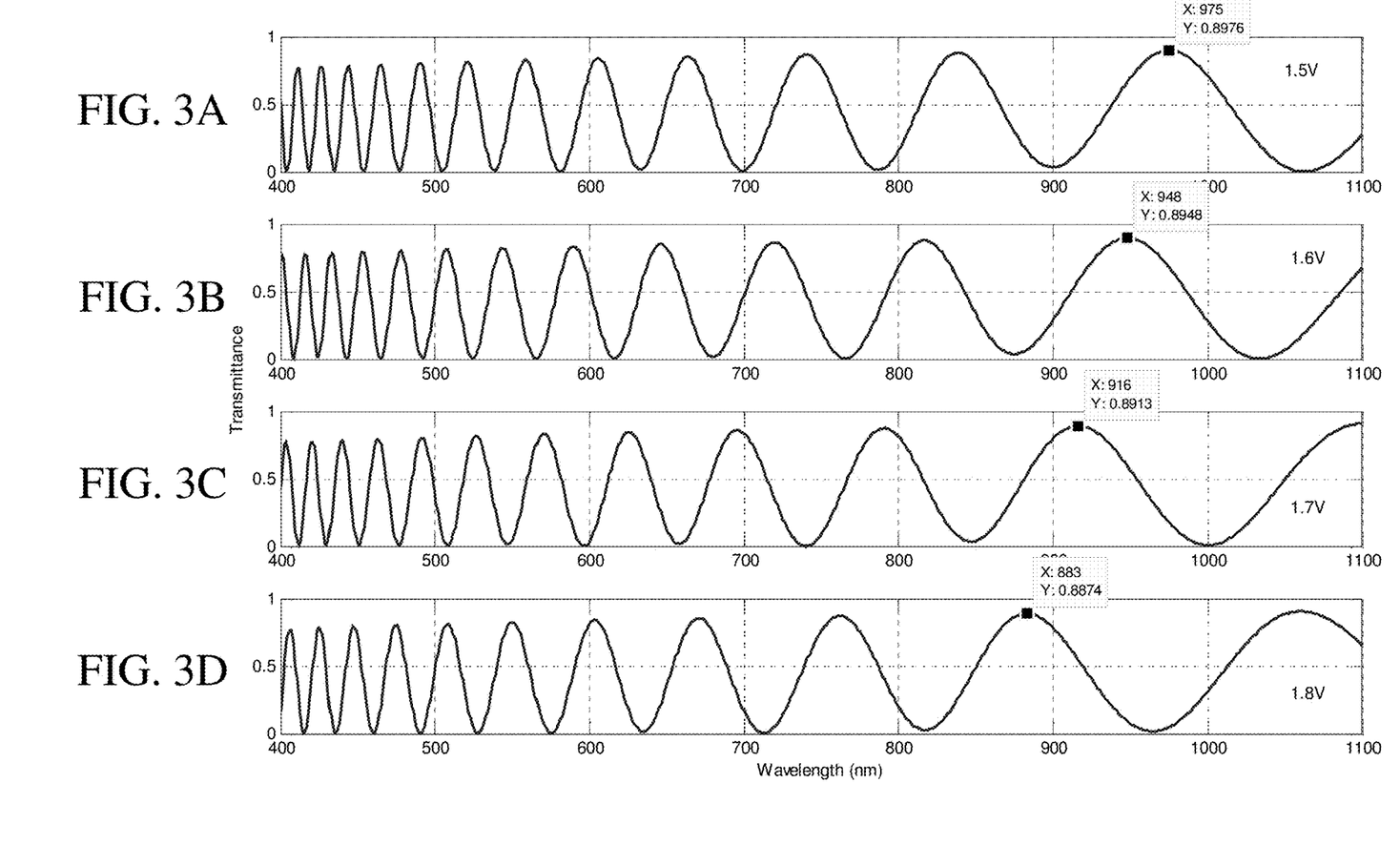
FIG. 3A depicts a transmission spectrum for an illustrative filter stage, wherein 1.5 V is applied to the optical filters and the TN cell is activated, in accordance with an embodiment.
FIG. 3B depicts a transmission spectrum for the illustrative filter stage, wherein 1.6 V is applied to the optical filters and the TN cell is activated, in accordance with an embodiment.
FIG. 3C depicts a transmission spectrum for the illustrative filter stage, wherein 1.7 V is applied to the optical filters and the TN cell is activated, in accordance with an embodiment.
FIG. 3D depicts a transmission spectrum for the illustrative filter stage, wherein 1.8 V is applied to the optical filters and the TN cell is activated, in accordance with an embodiment.

In one embodiment, the LCTF stage 100 described above could be used in an imaging system as a standalone element. In another embodiment, the LCTF stage 100 could be combined with one or more similar stages into a tunable optical filter assembly, such as the LCTF assembly 200 shown in FIGS. 2A-2D. In this embodiment, the individual LCTF stages 100 could have the same or different characteristics, filter different wavelengths, and so on. In the depicted embodiment, the LCTF assembly 200 includes four LCTF stages 100a, 100b, 100c, 100d (each of which corresponds to the LCTF stage 100 illustrated in FIG. 1); however, this is simply for illustrative purposes, and various embodiments of the LCTF assembly 200 can include any number (i.e., one or more) of LCTF stages 100. Because (i) the LCTF stages 100 can have different characteristics, filter different wavelengths, and so on when activated and (ii) the LCTF stages 100 are transparent when deactivated, the overall properties of the LCTF assembly 200 can be altered, without physically moving any of the LCTF stages 100 in and out of the optical path, by selectively applying appropriate voltages to various combinations of the LCTF stages 100. In other words, the LCTF assembly 200 can be switched between various operational modes by selectively activating or deactivating the LCTF stages 100 via the application of a particular voltage to each of the LCTF stages 100. In one embodiment, if all of the LCTF stages 100 are activated, then the LCTF assembly 200 operates in an MCF mode (i.e., functions as an MCF), such as is shown in FIG. 2A. In one embodiment, if a subset (i.e., less than all) of the LCTF stages 100 are activated, then the LCTF assembly 200 operates in a CF mode (i.e., functions as a CF), such as is shown in FIG. 2C. In one embodiment, the LCTF assembly 200 may still operate in the MCF mode if particular LCTF stages 100 are deactivated. For example, FIG. 2B depicts an illustrative embodiment where the deactivation of the fourth LCTF stage 100d causes the LCTF assembly 200 to operate in an adaptive broadband MCF mode. In one embodiment, if all of the LCTF stages 100 are deactivated, then the LCTF assembly 200 is in a transparent mode (i.e., the LCTF assembly 200 is transparent to any received light).

Accordingly, by toggling one or more of the LCTF stages 100 into the deactivated or "transparent" state, an adaptive broader bandpass peak can be achieved upon demand. Because the CF mode uses a subset of the LCTF stages 100 that are used when the LCTF assembly 200 is in the MCF mode, toggling the desired stages into an "activated" state and undesired stages into a "transparent" state allows the LCTF assembly 200 to electrically switch between an MCF mode with adaptive spectral bandwidths, a CF mode with greater degrees of freedom in the selection of LCTF stages 100, and a transparent or unfiltered mode. All of this is achieved solely through electrical control, without any moving mechanical components to control the LCTF stages 100. Further, the CF mode can utilize any combination of a single LCTF stage 100 or multiple LCTF stages 100, without any limit, depending upon the application-specific requirements for the CF mode.

In practice, the phase retardation of TN cells and ECB cells each depend on the angle of incidence of the light. Therefore, the performance of both the activated and deactivated states of the LCTF stage 100 can be degraded by oblique incidence of light. In one embodiment, a super-twisted nematic (STN) liquid crystal cell could be used instead of a 90° TN cell, as described above. Such an embodiment could be beneficial in order to enhance the off-axis performance of the LCTF assembly 200.

In another embodiment, the optical filters 104, 108 could include two LCCs that are oriented in opposite directions with respect to the optical axis in order to enhance the off-axis performance of the LCTF stage 100 and improve the switching speed via a thinner cell gap.

In another embodiment, the optical filters 104, 108 could include a Pi cell to further improve the off-axis performance, passband throughput, and response time of the filter with only half as many LCCs as the aforementioned embodiment.

In one embodiment, the TN cell 106 could include a 90° TN cell having a 10 μm cell gap. In such an embodiment, the top substrate of the TN cell 106 could abut the first optical filter 104 and have a parallel rubbing direction relative to the optical axis of the first optical filter 104. Further, the bottom substrate of the TN cell 106 could abut the second optical filter 108 and have a perpendicular rubbing direction (relative to the first optical filter 104).

As noted above, the second optical filter 108 can be identical or substantially similar (e.g., have the same thickness) to the first optical filter 104, except that the optical axis of the second optical filter 108 is rotated 90° relative to the first optical filter 104. A variety of different embodiments having different types and materials of filters, different thicknesses and optical axes for the various components of the LCTF stage 100, and different orientations for the polarizers 102, 110 are all within the scope of the present disclosure.

EXAMPLES

As described above, LCTF assemblies 200 including one or more of the LCTF stages 100 illustrated in FIG. 1 can be switchable between multiple different modes, including an MCF mode and a CF mode. One illustrative configuration for such a LCTF stage is set forth below in TABLE 1.

TABLE 1

| Component | Polarizer | ECB LC Cell | | Quartz | TN LC Cell | | Quartz | ECB LC Cell | | Polarizer |
|---|---|---|---|---|---|---|---|---|---|---|
| Thickness (μm) | n/a | 10 | | 200 | 10 | | 200 | 10 | | n/a |
| Pretilt Angle (°) | n/a | 2 | 2 | n/a | 2 | 2 | | 2 | 2 | n/a |
| Optical Axis (°) | 0 | 45 | 45 | 45 | 45 | −45 | −45 | −45 | −45 | 0 |
| Notes | n/a | Top substrate | Bottom substrate | Variable thickness | Top substrate | Bottom substrate | Variable thickness | Top substrate | Bottom substrate | n/a |

In various embodiments, the LCTF stage 100 and the components thereof can have a variety of different physical characteristics, which can in turn affect the characteristics of the LCTF stage 100. For example, the optical filters 104, 108 can have a variety of different thicknesses or cell gaps. In various embodiments, the LCTF stage 100 can include a variety of additional components, such as retarders (e.g., quartz retarders), positioned between the TN cell 106 and the optical filters 104, 108. Further, the thicknesses and other characteristics of the additional components can be varied based upon the desired spectral resolution for the LCTF stage 100.

Figure 4:
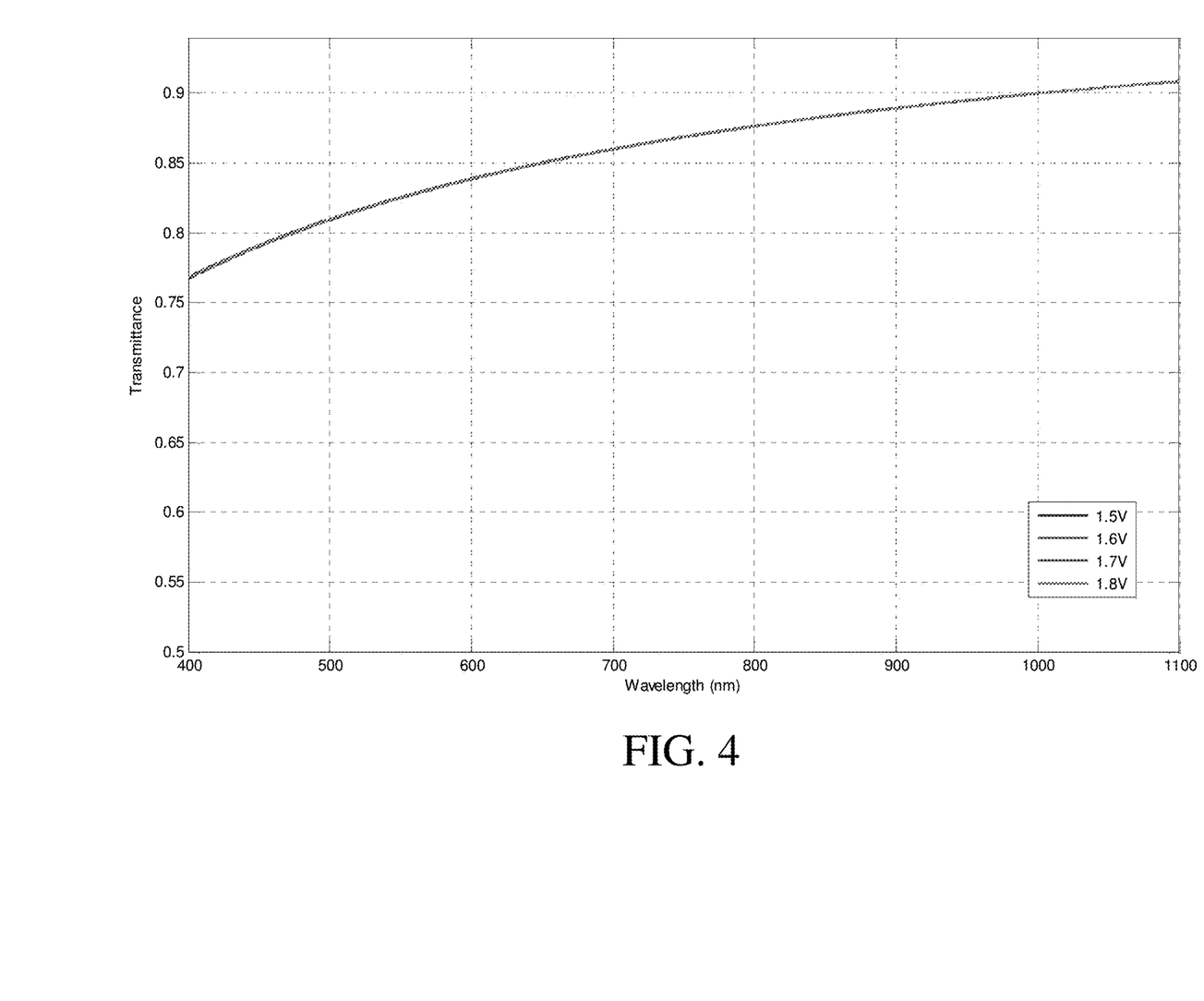
FIG. 4 depicts transmission spectra for the illustrative filter stage, wherein various voltages are applied to the optical filters and the TN cell is deactivated, in accordance with an embodiment.

In one illustrative embodiment, the optical filters 104, 108 could include a liquid crystal cell (LCC) with a 10 μm cell gap that is abutted with one birefringence retarder having a thickness of 200 μm, which is rotated 45° relative to the first polarizer 102. The retarder thickness can be varied based on As generally described above, applying different voltages to the LCTF stages 100 can generate different transmission spectra for the filter stages 100. To illustrate, FIGS. 3A-3D show transmission spectra for the illustrative LCTF stage 100 set forth above in TABLE 1 when the TN cell 106 is activated (e.g., 0 V is applied) and 1.5 V, 1.6 V, 1.7 V, and 1.8 V, respectively, are applied to the ECB optical filters. Still further, FIG. 4 shows transmission spectra when the TN cell is deactivated (e.g., 5 V is applied) and the aforementioned voltages are respectively applied to the ECB optical filters for the illustrative filter stage set forth above in TABLE 1. As can be seen, the LCTF stage 100 exhibits the same transmission spectra when the TN cell 106 is deactivated (i.e., the LCTF stage 100 is in the deactivated or transparent mode) regardless of the voltage applied to the ECB optical filters.

Figure 5:
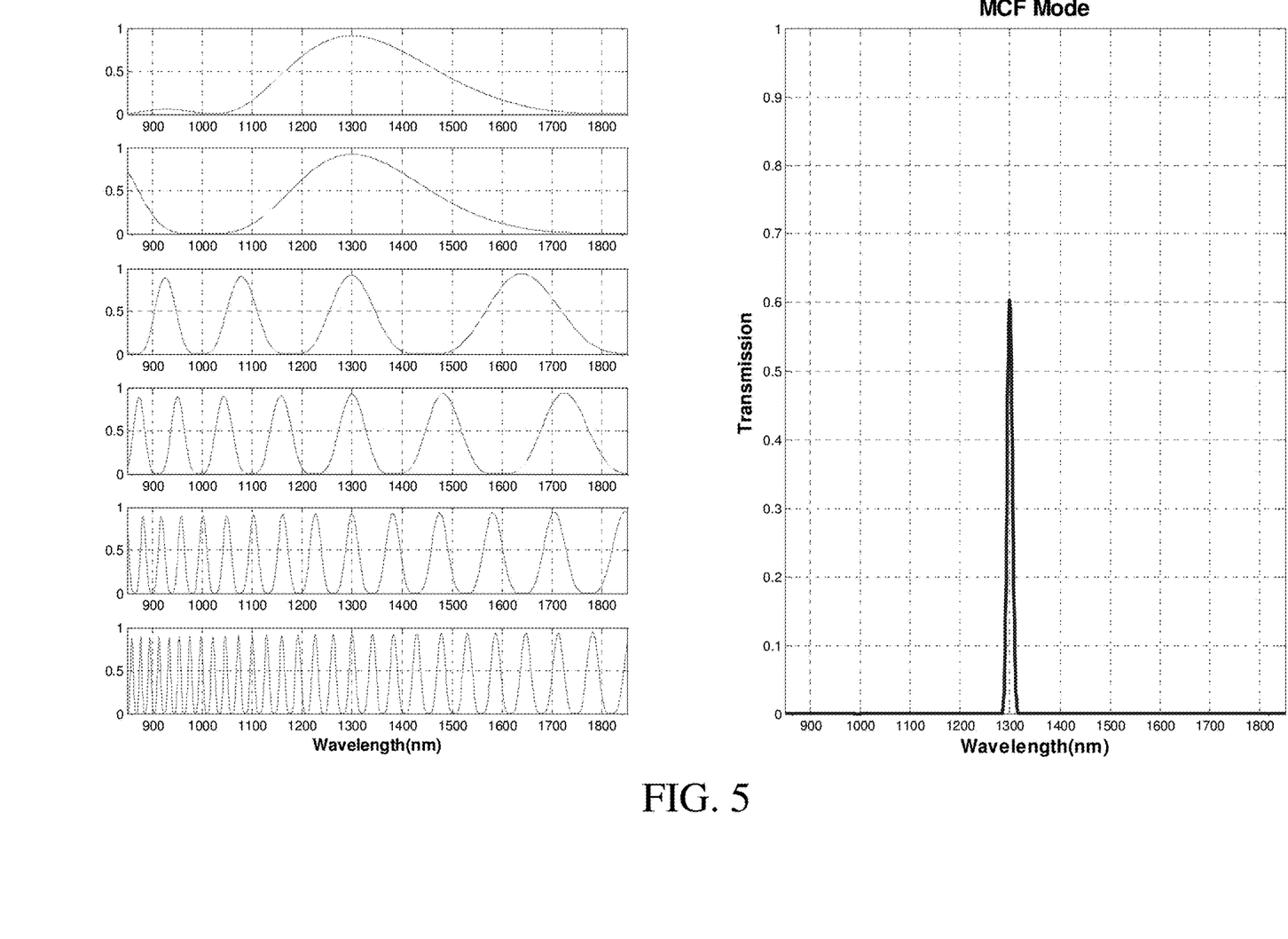
FIG. 5 depicts transmission spectra for an illustrative filter assembly and the individual filter stages thereof, wherein the filter assembly is in an MCF mode, in accordance with an embodiment.
Figure 6:
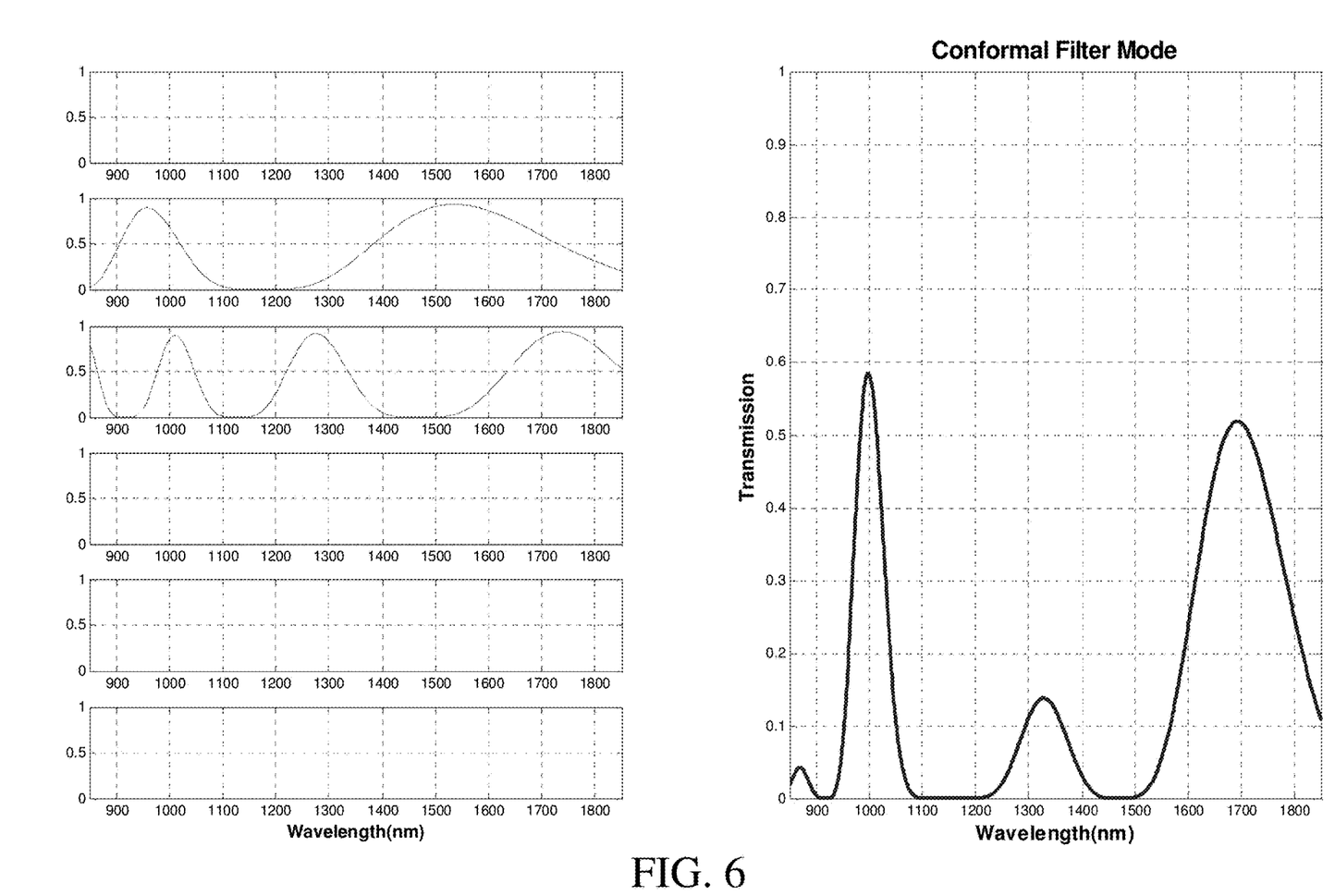
FIG. 6 depicts transmission spectra for an illustrative filter assembly and the individual filter stages thereof, wherein the filter assembly is in an CF mode, in accordance with an embodiment.
Figure 7:
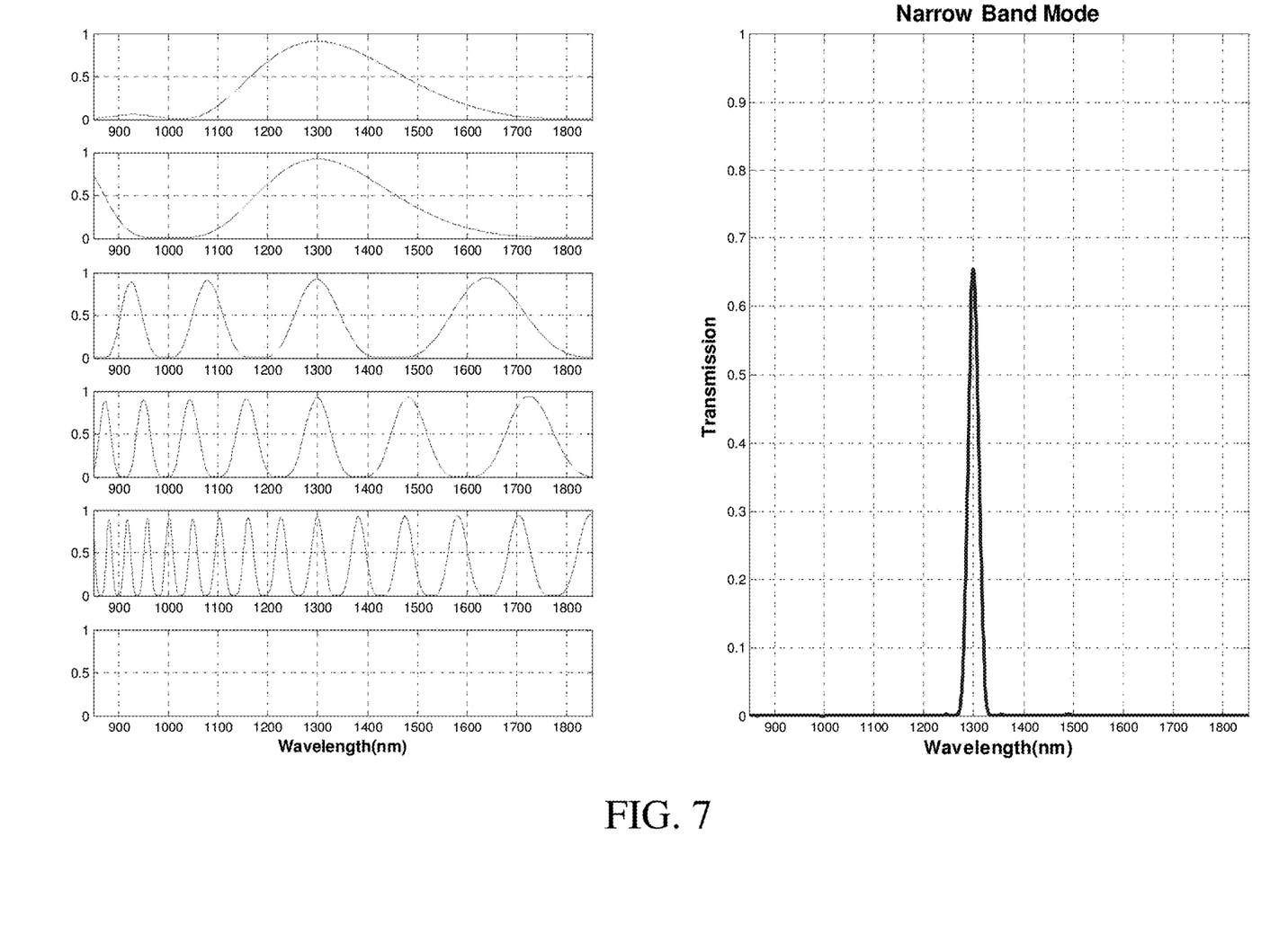
FIG. 7 depicts transmission spectra for an illustrative filter assembly and the individual filter stages thereof, wherein the filter assembly is in a narrow band mode, in accordance with an embodiment.
Figure 8:
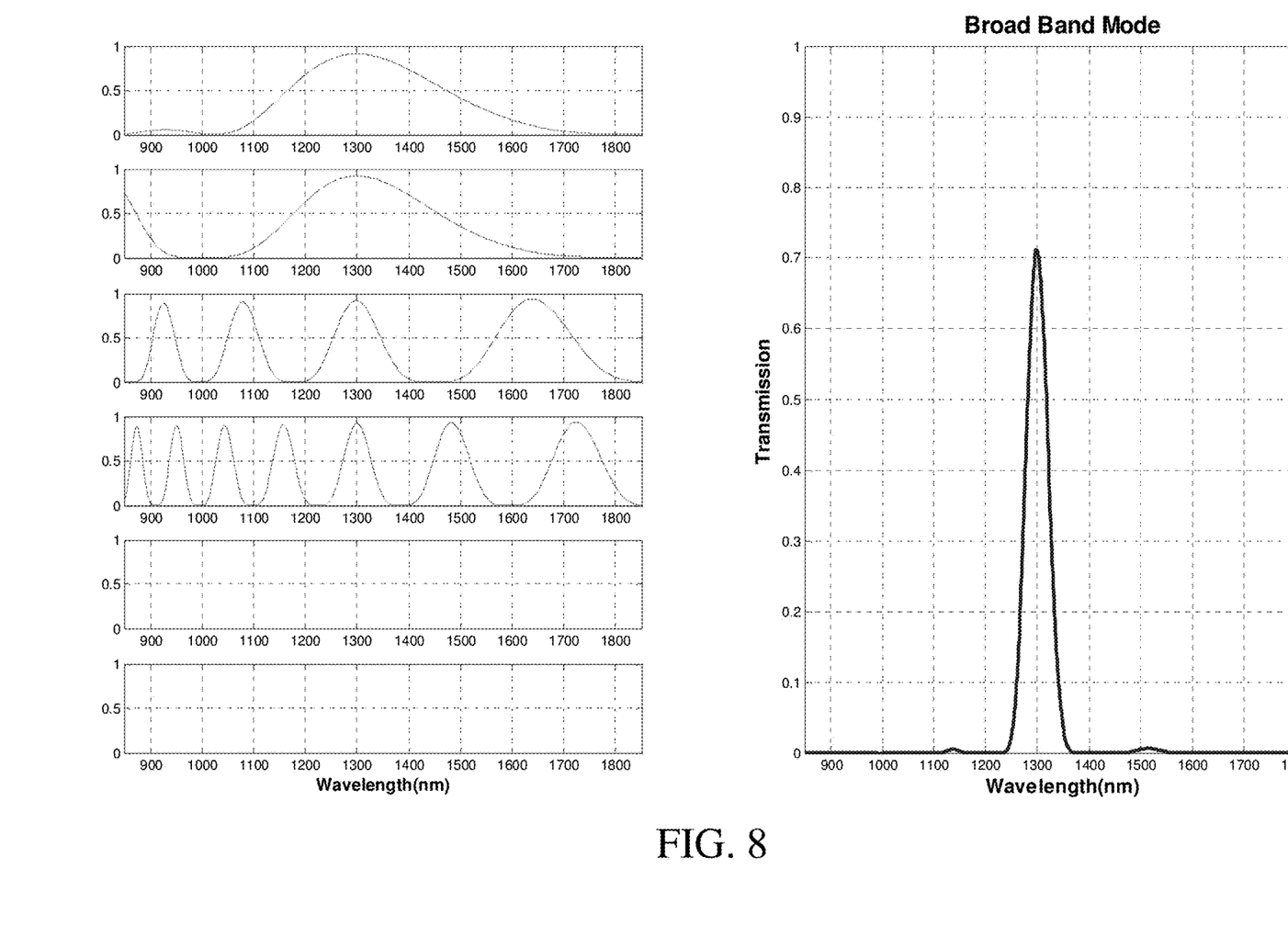
FIG. 8 depicts transmission spectra for an illustrative filter assembly and the individual filter stages thereof, wherein the filter assembly is in a broad band mode, in accordance with an embodiment.

As another illustration, FIGS. 5-8 depict modeled transmission spectra for an LCTF assembly 200 including six LCTF stages 100. In each of FIGS. 5-8 the individual transmission spectra for each of the six LCTF stages 100 is depicted on the left, and the transmission spectra for the LCTF assembly 200 as a whole is depicted on the right. In FIG. 5, the LCTF assembly 200 is operating in the MCF mode, with the voltages applied across the stages set forth below in TABLE 2. In FIG. 6, the LCTF assembly 200 is operating in the CF mode, with the voltages applied across the stages set forth below in TABLE 3. In FIG. 7, the LCTF assembly 200 is operating in the narrow band mode, with the voltages applied across the stages set forth below in TABLE 4. In FIG. 8, the LCTF assembly 200 is operating in the broadband mode, with the voltages applied across the stages set forth below in TABLE 5.

TABLE 2

| Stage | Voltage |
|---|---|
| 1 | 2.43 |
| 2 | 1.90 |
| 3 | 1.44 |
| 4 | 1.98 |
| 5 | 1.75 |
| 6 | 2.03 |

TABLE 3

| Stage | Voltage |
|---|---|
| 1 | N/A |
| 2 | 1.70 |
| 3 | 2.20 |
| 4 | N/A |
| 5 | N/A |
| 6 | N/A |

TABLE 4

| Stage | Voltage |
|---|---|
| 1 | 2.43 |
| 2 | 1.90 |
| 3 | 1.44 |
| 4 | 1.98 |
| 5 | 1.75 |
| 6 | N/A |

TABLE 5

| Stage | Voltage |
|---|---|
| 1 | 2.43 |
| 2 | 1.90 |
| 3 | 1.44 |
| 4 | 1.98 |
| 5 | N/A |
| 6 | N/A |

As can be seen as well in this embodiment, the LCTF assembly 200 can be operated in a variety of different modes by selectively activating or deactivating the various LCTF stages 100 via electrical control. Further, the operational characteristics of the LCTF assembly 200 can be tuned by varying the voltages applied to the various components of the LCTF stages 100, which allows operators to even further control the output of the LCTF assembly 200.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by 1/10 of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The functions and process steps herein may be performed automatically or wholly or partially in response to user command. An activity (including a step) performed automatically is performed in response to one or more executable instructions or device operation without user direct initiation of the activity.

What is claimed is:

1. A non-mechanical liquid crystal tunable filter (LCTF) assembly comprising:
    a first LCTF component comprising:
        a first optical filter comprising a first optical axis,
        a second optical filter comprising a second optical axis, wherein the second optical axis is rotated 90° relative to the first optical axis, and
        a first twisted nematic cell positioned between the first optical filter and the second optical filter, the first twisted nematic cell configured to polarize received light by 90° when a first voltage is not applied and not polarize the received light when the first voltage is applied; and
    a second LCTF component comprising:
        a third optical filter comprising a third optical axis,
        a fourth optical filter comprising a fourth optical axis, wherein the fourth optical axis is rotated 90° relative to the third optical axis, and
        a second twisted nematic cell positioned between the third optical filter and the fourth optical filter, the second twisted nematic cell configured to polarize received light by 90° when a second voltage is not applied and not polarize the received light when the second voltage is applied;
    wherein the non-mechanical LCTF assembly is configured to switch between a conformal filter mode and a multi-conjugate filter mode based on whether the first voltage is applied to the first LCTF assembly, the second voltage is applied to the second LCTF assembly, or a combination thereof, and
    wherein a first one of the first optical filter, the second optical filter, the third optical filter, and the fourth optical filter comprises a Pi cell.

2. The non-mechanical LCTF assembly of claim 1, wherein a second one of the first optical filter, the second optical filter, the third optical filter, and the fourth optical filter comprises a Lyot filter.

3. A non-mechanical liquid crystal tunable filter (LCTF) assembly comprising:
    a plurality of LCTF components, each of the plurality of LCTF components comprising:
        a first optical filter comprising a first optical axis,
        a second optical filter comprising a second optical axis, wherein the second optical axis is rotated 90° relative to the first optical axis, and
        a first twisted nematic cell positioned between the first optical filter and the second optical filter, the first twisted nematic cell configured to polarize received light by 90° when a voltage is not applied and not polarize the received light when the voltage is applied;

wherein the non-mechanical LCTF assembly is configured to switch between a conformal filter mode and a multi-conjugate filter mode based on whether the voltage is applied to each of the plurality of LCTF components, and wherein one of the first optical filter and the second optical filter comprises a Pi cell.

* * * * *